Dec. 3, 1968  J. O. NASH  3,414,216
FORCE BALANCE OUTPUT CONTROL MECHANISM
Filed Oct. 18, 1966  3 Sheets-Sheet 1
FIG_1
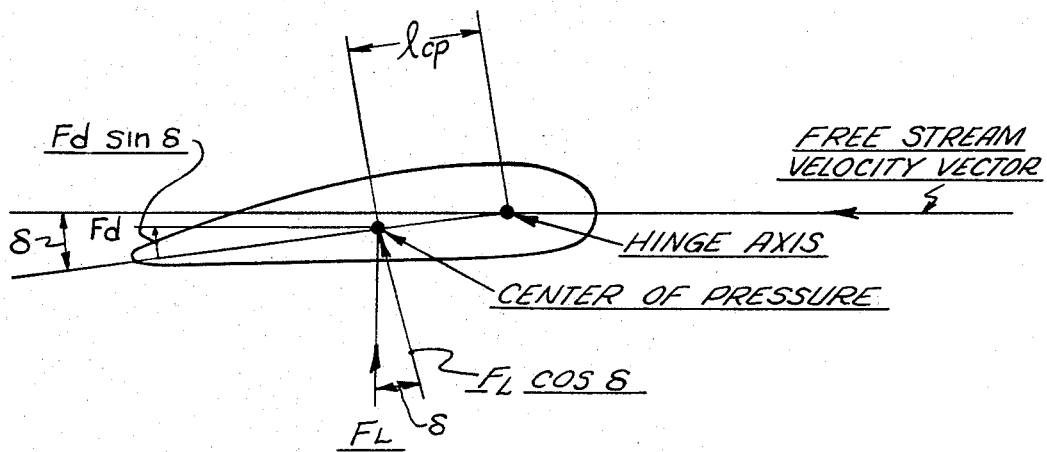
FIG_4
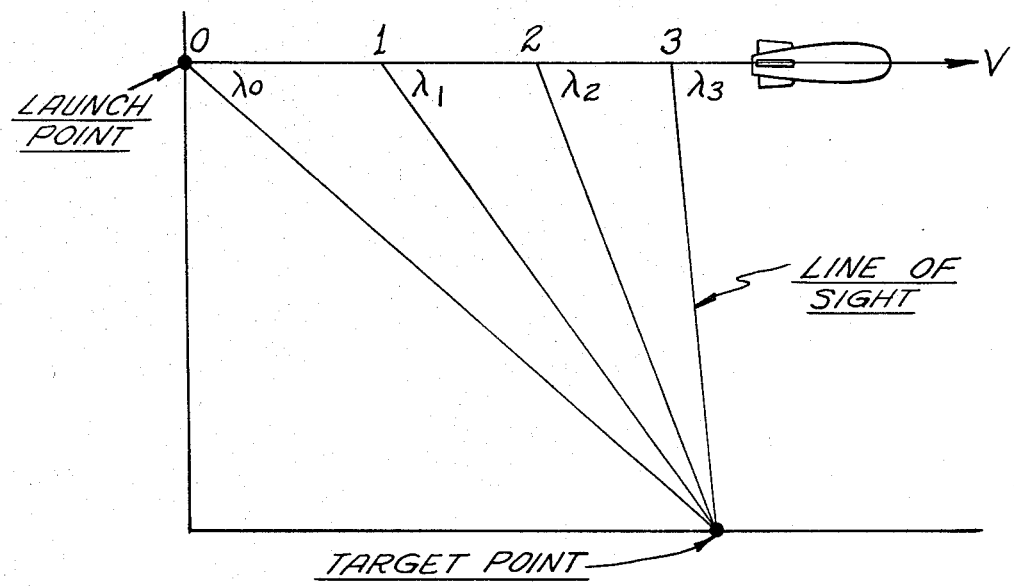
INVENTOR
JACK O. NASH
BY Radford W. Luther
ATTORNEY

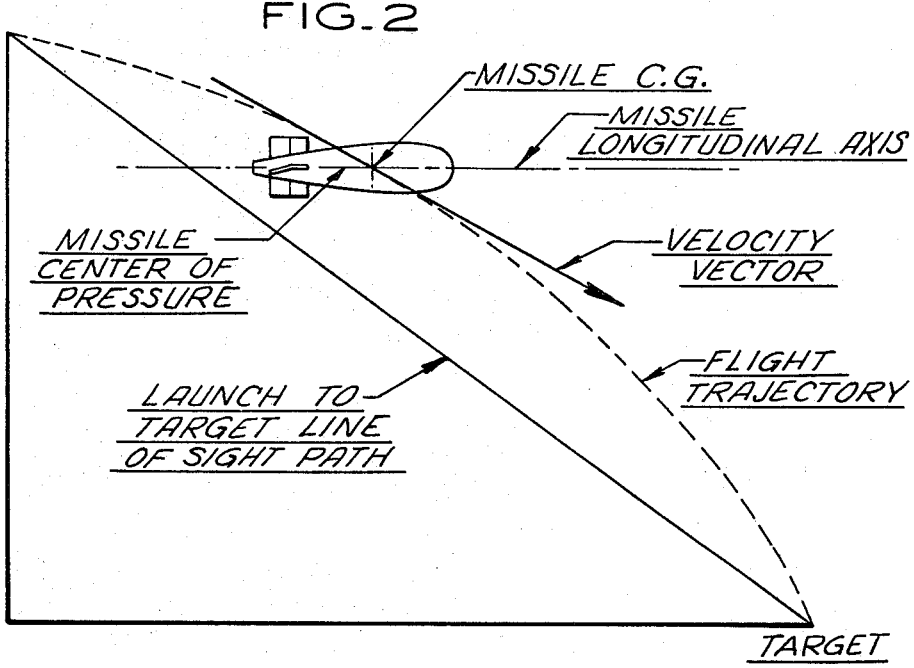
FIG_2
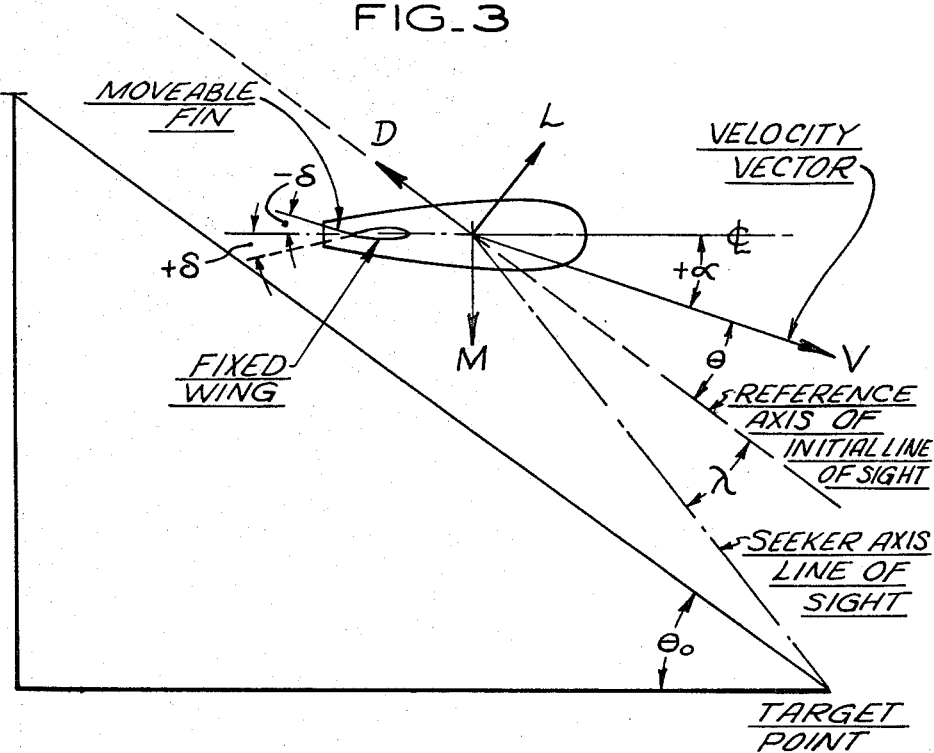
FIG_3

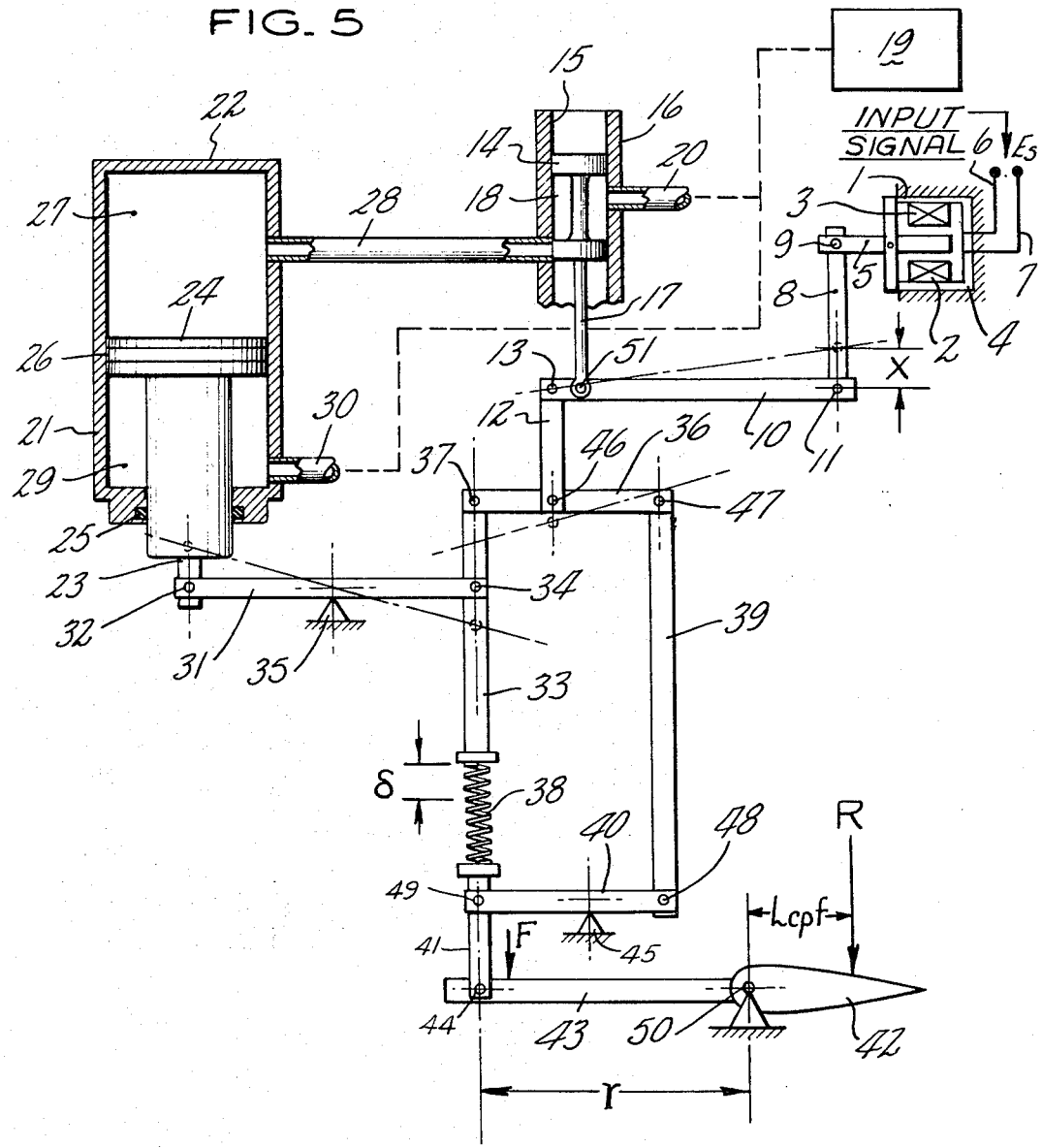

United States Patent Office 3,414,216
Patented Dec. 3, 1968

3,414,216
FORCE BALANCE OUTPUT CONTROL MECHANISM
Jack O. Nash, Manchester, Conn., assignor to Chandler Evans Inc., West Hartford, Conn., a corporation of Delaware
Filed Oct. 18, 1966, Ser. No. 591,373
12 Claims. (Cl. 244—3.21)

ABSTRACT OF THE DISCLOSURE

Control apparatus having an electrical input signal corresponding to actual dynamic response of the flight vehicle, said electrical input signal being converted into an amplified force output wherein each finite value of the amplified force is proportional to a finite value of input signal. An internal position feedback loop is connected between the electrical signal pilot valve input shaft and the force amplified output shaft. The amplified force output is applied to the flight vehicle steering element to provide a steering force that is proportional to the magnitude of the electrical input signal.

---

This invention relates to a control system for operation in conjunction with a guidance system; and more particularly has reference to a control system in which an electrical input signal is converted to a force output signal; the magnitude of the force being proportional to the magnitude of electrical input signal over the complete range of input signal operation. The invention also concerns a control unit in which an electrical input signal of low energy level is converted and amplified to a force output of high energy level with each finite increment of force proportional to a corresponding finite value of electrical input signal.

For illustrative purposes, the invention will be described with specific reference to a missile guidance system; its utility in other applications, however, will be readily apparent. Many missile systems use target tracking devices located in the missile proper as the primary means of guiding the missile to a preselected target. One type of target tracking system well known in the art produces an electrical signal that indicates the instantaneous angular rate of change of the line-of-sight of the tracking device with respect to the target. These tracking devices provide an electrical signal of relatively low energy level. This low energy electrical signal must be converted into a force capable of operating the control device that is used in combination with the tracker guidance device to steer the missile in response to the tracker device electrical command signal. The conventional way of providing the force to drive the control surface of the steering device is by means of a hydraulically or pneumatically operated actuator. In the instant application, however, it is desired to provide a force output that is proportional to the electrical input signal over the complete range of input signal operations, in addition to amplifying the input signal to a force level sufficient to move the control surface.

Accordingly, it is a nobject of the present invention to provide an improved control unit having the ability to receive a varying electrical input and convert said electrical input to a force output each incremental value of which is proportional to a corresponding incremental value of electrical input.

Another object of the invention is to provide a control system capable of receiving a varying input and converting said varying electrical input into a force output each increment of which is proportional to a corresponding electrical input, said control unit further having a force amplifier followup loop contained within the control unit to reset the force amplifier actuator for each variation in input signal.

A more specific object of the invention is to provide a missile flight control utilizing pneumatic actuation for at least part of the power supplied to the force output element.

Another object of the invention is to provide a control unit which maintains an essentially zero internal error in response to each electrical input signal while providing a force output of greatly increased magnitude relative to the electrical input signal.

Still another object of the invention is to provide a control unit in which an electrical input signal is controlled partly by mechanical linkage and partly by either hydraulic or pneumatic actuation to provide an output force which can be converted to an output torque, each value of said output torque being proportional to a corresponding value of electrical input signal.

Other objects of the invention will in part be obvious and will in part appear hereinafter.

For a fuller understanding of the nature and objects of the invention, reference should be had to the following detailed description taken in connection with the accompanying drawings in which:

FIGURE 1 is a graphical representation of the airfoil of a conventional steering fin.

FIGURE 2 is a graphical representation of a typical flight trajectory of an unpowered aerodynamically controlled, guided missile utilizing the present invention.

FIGURE 3 is a graphical representation of a fragmentary portion of the missile flight geometry.

FIGURE 4 is a graphical representation of the flight geometry characteristic of one mode of operation of a missile mounted tracker unit.

FIGURE 5 is a schematic diagram partly in cross section of a control mechanism embodying the instant invention as applied to a missile steering fin.

In general, the present invention is embodied in a class of guided missiles which are initially air-launched for a short powered flight and then proceed unpowered for the balance of the flight. Upon launch from the aircraft, the missile is powered by a rocket engine of very short duration. Following burn-out of the rocket engine, the missile proceeds on an unpowered flight whose trajectory is established by gravity and the aerodynamics of the missile. Many missiles of this type utilized an onboard tracker device which orients itself on the target at the time of launch and continuously detects position error in the missile flight path by means of the variation in magnitude of the angular rate of change of the tracker line of sight in relation to a fixed reference axis. The output of the tracker device is the primary guidance intelligence that is used to control the flight of the missile, to permit the missile to be guided to the preselected target. The control unit by application of the torque balance principle to the interaction of the control unit and the steering fins guides the missile along a flight path dictated by the guidance intelligence received from the tracker unit.

In order to facilitate an understanding of the problems associated with the operation of force amplifying proportional control mechanisms solved by the instant invention, an understanding of the principles of torque balance-proportional guidance and its application to the instant control will be presented.

This description relates to the use of the torque balance concept in a flight control system. For purposes of clarity, the description of the torque balance flight control system, and its application to a missile control system with proportional guidance can best be presented by briefly describing the three major elements comprising this guidance system, and the inter-relation of each to the other.

The particular application of the torque balance principle described herein applies to a flight control system for a missile guidance system. The particular missile configuration under consideration utilizes aerodynamic control surfaces as the primary method of steering the missile. Hence, a logical starting point in the description of the torque balance concept is to describe the interaction between the aerodynamic forces of the fin airfoil and their relationship to the flight control force system.

A typical fin airfoil section is shown in FIGURE 1. This airfoil section is shown rotated about the hinge pin axis such that an angular displacement $\delta$ in relation to the free stream velocity vector is produced. FIGURE 1 implies that the airfoil section is in an environment having a fluid flow that will produce a free stream velocity vector as shown. From FIGURE 1 it will be noted a torque balance equation can be written about the hinge pin including the aerodynamic forces acting on the fin. The fin torque $T_F$ produced by the aerodynamic forces acting on the fin can be established by the following equation:

$$T_F = [F_d \sin \delta + F_L \cos \delta] l_{cp} \quad (1)$$

where:

$F_d$ = drag force, pounds
$F_L$ = lift force, pounds
$l_{cp}$ = moment arm, feet
$\delta$ = fin angular displacement, degrees The drag force can be related to dynamic pressure as follows:

$$F_d = C_d \frac{\rho V^2}{2g} A_s \quad (2)$$

where:

$C_d$ = drag coefficient
$\rho$ = density, pound/ft.$^3$
$V$ = velocity, ft./sec.
$g$ = gravitational constant, ft./sec.$^2$
$A_s$ = airfoil surface area, ft.$^2$ Similarly, the lift force can be related to dynamic pressure as follows:

$$F_L = C_L \frac{\rho V^2}{2g} A_s \quad (3)$$

where:

$C_L$ = lift coefficient
$\rho$ = density, pounds/ft.$^3$
$V$ = velocity, ft./sec.
$g$ = gravitational constant, ft./sec.$^2$
$A_s$ = airfoil surface area, ft.$^2$ Substituting Equations 2 and 3 into Equation 1, Equation 1 becomes:

$$T_F = \left[ C_d \frac{\rho V^2}{2g} A_s \right] \sin \delta + \left[ C_L \frac{\rho V^2}{2g} A_s \right] \cos \delta l_{cp} \quad (4)$$

Assuming $C_d$, $C_L$, $g$, $l_{cp}$ and $A_s$ remain constant, then Equation 4 can be written as:

$$T_F = K_1 [\rho V^2 \sin \delta] + K_2 [\rho V^2 \cos \delta] \quad (5)$$

From Equation 5 it can be seen that for a constant $\delta$ and an increase in either $\rho$ or $V$, the fin torque $T_F$ becomes greater provided the moment arm $l_{cp}$ from the hinge pin to the center of pressure remains constant.

Also assuming $C_d$ increases in relation to $C_L$ for an increase in $\delta$, it can be seen from Equation 5 that the fin torque $T_F$ will become larger with an increase in $\delta$ for a constant $\rho$ and $V$.

For a simultaneous change in fin deflection $\delta$, and either density (altitude) $\rho$ or velocity $V$, the change in fin torque $T_F$ required to produce a given fin deflection $\delta$ varies directly as the density $\rho$ and directly as the square of the velocity $V$. Thus, the relationship of fin torque $T_F$, fin deflection $\delta$ and the aerodynamic conditions of density $\rho$ and velocity $V$ can be stated as follows:

$$\frac{T_F}{f(\delta)} \propto \rho V^2$$

or rearranged
where:

$$T_F = K \delta \rho V^2 \quad (6)$$

$K$ = constant of proportionality.

This relationship is called the "aerodynamic spring rate" of the fin airfoil. The operation of this "aerodynamic spring rate" can best be understood by visualizing a simultaneous increase in velocity $V$ and fin torque $T_F$. The requirement for an increase in fin deflection $\delta$ would necessitate an increased fin torque. However, the simultaneous increase in velocity $V$ will result in an increase in the airfoil lift and drag forces $F_L$ and $F_d$. This increase in force will require a smaller fin deflection $\delta$ than would be required to produce the same net fin torque if the velocity increase were not present. Hence, the "aerodynamic spring rate" or force per unit of fin deflection is increased, thereby resulting in the decreased net fin deflection required. It is this relationship between the fin deflection and free system velocity that produces the analogy to a mechanical spring system and hence the terminology "aerodynamic spring rate."

Equation 6 establishes the torque-displacement proportionality relationship of the control surface. The next step is to describe this steering surface as related to a particular missile configuration in which the torque balance flight control concept is applied. The particular missile configuration chosen is a vehicle that is air-launched with a short initial powered flight and is then aerodynamically controlled for a long unpowered discent to the target. A typical flight path trajectory from the launch point to the target is shown in FIGURE 2. For the purpose of a more lucid presentation, a much enlarged fragmentary portion of the complete FIGURE 2 flight path traversed by the missile is shown in FIGURE 3. The relationship of the steering fin aerodynamics described hereinabove to the guidance and control of the missile along the flight path can best be shown by means of a single axis analysis of an element of the unpowered portion of the flight of the missile.

For the purposes of ease of presentation, the application of "proportional navigation" to the instant missile guidance and control system will be described as a prelude to a description of the torque balance control concept. The proportional solution, well known in the art, is generally referred to as "proportional navigation." By accepted definition (Ref.: "Principles of Guided Missile Design," Locke, page 475) a proportional navigation course is a course in which the rate of change of the missile heading (denoted as $\theta$) is directly proportional to the rate of rotation of the line-of-sight (denoted as $\lambda$) from the missile to the target. The object is to obtain and maintain a collision course with the target, particularly if the target is moving or begins to move. As long as the missile remains on a collision course, as indicated by zero rotation of the line-of-sight, no steering commands are given. Any rotation of the line-of-sight, indicating departure from a collision course, is detected by the missile tracker system. The rate of change of the line-of-sight $\lambda$ established by the tracker system is transmitted to the missile control system that is the particular subject of the instant invention, which through steering fins then turns the missile at a rate proportional to the rate of rotation of the line-of-sight in such a direction as to reduce the line-of-sight rate and get the missile back on a constant-bearing course.

In the case in question, the missile heading $\theta$, as shown in FIGURE 3, is referenced to the initial tracker platform orientation at launch, that is, to the initial line-of-sight (denoted as $\theta_0$) in FIGURE 3. This initial line-of-sight reference $\theta_0$ is established and maintained by missile seeker-tracker unit in conjunction with a gimballed gyro-stabilized platform. In like manner, the instantaneous bearing of the line-of-sight from the missile to the target (denoted as $\lambda$), as shown in FIGURE 3, is also referenced to the initial platform angle $\theta_0$ established by the gyro-stabilized platform upon release at the instant of launch. To meet the definition of proportional navigation, the rates of change of the angles $\theta$ and $\lambda$ must be mathematically related such that:

$$\dot{\theta} = K_1 \dot{\lambda} \qquad (7)$$

where:

$\dot{\theta}$ = rate of change of missile heading, radians/sec.,
$\dot{\lambda}$ = rate of change of line-of-sight heading, radians/sec.,
$K_1$ = proportionality constant.

The usual range for the proportionality constant $K_1$ of Equation 7 above is from 3 to 5. A value of $K_1 = 1$ results in a pursuit or tail chase course, and thus precludes the ability to establish the desired collision course.

The classical treatment of "proportional navigation" concerns missiles at constant velocity. For missiles which operate at a varying velocity or over a large range of velocities, a more meaningful expression of Equation 7 is:

$$V\dot{\theta} = K_2 \dot{\lambda} \qquad (8)$$

where:

$\dot{\theta}$ and $\dot{\lambda}$ = the same as defined in Equation 7 above,
$V$ = the flight velocity of the missile, ft./sec.

For the case of constant velocity, the Equation 8 value of $K_2$ can be expressed as follows:

$$K_2 = K_1 V$$

In particular we note in Equation 8 that:

$$V\dot{\theta} = a_n \qquad (9)$$

where $a_n$ = the normal or lateral acceleration of the missile, ft./sec.$^2$.

As is well known in the art, the number of "g's" (where "g" is defined as $a_n/32.2$) associated with the normal acceleration due to missile maneuvers is a primary consideration in the structural design of missiles. In general, it is well established in the art that the effect of normal acceleration has the same influence on mechanical design and missile guidance and control system design, whether the missile is powered or unpowered, whether the missile is proceeding at essentially a constant or greatly varying velocity, or whether the missile must be designed for missions which include a large range of missile velocities.

In particular, for a vehicle with a large range of mission velocities and altitudes due to varying launch conditions from the aircraft, it has been established that if the relationship of Equation 8 can be maintained substantially independent of flight velocity $V$ and air density $\rho$, then the normal accelerations $a_n$ due to error commands proportional to $\dot{\lambda}$ will be essentially the same throughout the entire mission design envelope. This is attained through torque balance operation as will be shown.

However, to be complete as a proportional guidance and control philosophy, it must be shown that the conditions of Equation 8 when applied to a missile problem account for actual missile velocities, since the rate of change in missile heading $\dot{\theta}$ remains a function of this variable $V$. That is, the rate of change in missile heading $\dot{\theta}$ for a given error command $E_s$ proportional to $\dot{\lambda}$ is still dependent on missile velocity $V$. As indicated by Equation 8, the higher the missile velocity, the smaller the rate of change in heading $\dot{\theta}$ for a given error signal $E_s$. Therefore, to be a true proportional guidance approach, it is necessary that the error signal $E_s$ itself be a function of velocity $V$. That is, at a higher missile velocity $V$, the error signal $E_s$ must be proportionately higher to result in the same rate of change in missile heading $\dot{\theta}$.

This needed velocity dependency enters the solution through a natural flight phenomenon which is sometimes called "missile integration." Actually, the consequences of missile integration are very broad and include corrections for all types of missile flight deviations that come within the capabilities of the particular missile system.

"Missile integration" in its simplest terms can best be demonstrated by considering the horizontal flight of a vehicle over a fixed target as shown in FIGURE 4.

As shown in FIGURE 4, the velocity vector V represents the line of reference as well as the velocity vector. It can be seen from FIGURE 4 that the line-of-sight angle $\lambda$ depends only on the spatial location of the vehicle. However, the rate of change of $\lambda$ clearly depends directly on the velocity between successive locations (1, 2, 3 . . .) along the flight path. If the vehicle velocity changes, the rate of rotation $\dot{\lambda}$ of the line-of-sight must change correspondingly. In the limit the rate of rotation $\dot{\lambda}$ at any position of the vehicle must be directly proportional to the instantaneous velocity of the vehicle. It is well known in the art that the same proportionality relationship between $\dot{\lambda}$ and vehicle instantaneous velocity holds for flight paths other than horizontal. Hence, the direct proportionality relationship between $\dot{\lambda}$ and vehicle instantaneous velocity is applicable to the general trajectory of a missile. Therefore, the spatial-motion relationships exist which complete the necessary and sufficient conditions for proportional control.

The term "missile integration" is sometimes used to depict the net result of these relationships. It has been found, using the principles set forth above and neglecting perturbations due to gravity, drag, missile dynamics, that similar missiles launched at various velocities but having the same target mission have the same trajectory. That is, the integrated solution of the commanded rates of change in missile heading $\dot{\theta}$ is the same in each case. However, missile integration in its broader meaning pertains to the corrective action which occurs to reduce and eliminate the effects of deviations. It can be visualized that if in mid-course the target moved some distance from its initial location, the line-of-sight rotation would be altered and a new bearing pattern established to intercept the target in its new location. If next the target moved back to its original location, this would again be detected and new corrective action taken. While the actual trajectory of the missile in this case will differ from that which would have occurred if the target had not moved, it can be seen that the integrated result is a trajectory which takes the missile to the same location. In like manner, when other deviations occur such as due to aerodynamic drag or the varying effect of control bias to offset gravity, corrective action results from the variation of $\dot{\lambda}$ whose integration is a trajectory to the target. This assumes, of course, that the corrective actions required are within the ability of the missile and can be accomplished in the time available.

The missile shown in FIGURE 3 establishes a line-of-sight rate of rotation $\dot{\lambda}$ by means of its tracker system. This error signal $E_s$ is transmitted to the control system where it is converted into a force that results in a torque being applied to an aerodynamic control that steers the missile. When the torque applied to the aerodynamic control fin, denoted at $T_F$, is proportional to the error signal $E_s$, the "torque balance" concept by definition exists.

Expressed mathematically, the torque balance is defined thusly:

$$T_F \propto E_s \qquad (10)$$

To show that "proportional navigation" results from "torque balance" control operation, it is necessary to show that, independent of variations in $\rho$ and $V$, the following relationship holds:

$$V\dot{\theta} \propto \dot{\lambda} \qquad (11)$$

Or, expressed as a measure of torque, if the magnitude of the error command $E_s$ produces a proportional fin torque $T_F$, it is necessary to show that:

$$V\dot\theta \propto T_F \qquad (12)$$

Considering the single axis pitch plane of motion, shown in FIGURE 3, the tangential acceleration of the missile is:

$$\dot V = g \sin(\theta_0 - \theta) - \frac{D}{M} \qquad (13)$$

where:

$\dot V$=tangential missile acceleration, ft./sec.$^2$.
$g$=gravitational constant, ft./sec.$^2$.
$\theta_0$=initial reference heading of missile, degrees.
$\theta$=heading of missile under consideration, degrees.
$D$=drag force, pounds.
$M$=missile gravitational force, slugs.

This acceleration influences guidance and control only during missile dynamic transients as bearing angle $\theta$ and drag $D$ are affected and thus is not pertinent to the basic control problem. The normal acceleration results from the summation of forces acting on the C.G. of the missile perpendicular to the flight path. The normal acceleration can be represented mathematically as follows:

$$V\dot\theta \frac{L}{M} - g \cos(\theta_0 - \theta) \qquad (14)$$

where:

$L$=lift, $\frac{1}{2}\rho V^2 S_r C_L$.
$V\dot\theta$=normal acceleration, ft./sec.$^2$.
$g$, $\theta_0$ and $\theta$=as defined in Equation 6.
$\rho$=density, pounds/ft.$^3$.
$V$=free stream velocity, ft./sec.
$S_r$=control surface area, ft.$^2$.
$C_L$=coefficient of lift.

The gravity term [$g \cos(\theta_0 - \theta)$] in Equation 14 is offset by a control bias such that the missile flight trajectory is on or above the initial line-of-sight. The net normal acceleration which results from this bias during flight is ultimately eliminated by the corrective action previously discussed. Therefore, for the basic control problem:

$$V\dot\theta = \frac{L}{M} \qquad (15)$$

The lift coefficient $C_L$ is dependent upon the angle of attack $\alpha$, and the fin deflection $\delta$. From wind tunnel data of missiles of the type considered, it has been found that $C_L$ can be expressed as follows:

$$C_L = C_{L\alpha}\alpha + C_{L\delta}\delta \qquad (16)$$

where:

$C_{L\alpha}$=lift coefficient of fixed wing area,
$\alpha$=angle of attack, degrees (small angles wherein tan $\theta - \theta$),
$C_{L\delta}$=lift coefficient of moveable control surface,
$\delta$=angle of control surface deflection, degrees.

Missile pitch torque results from the flap torque $M_\delta$ and the wing torque $M_\alpha$ about the C.G. of the missile. The angular equation of motion is:

$$I\ddot\Phi + \beta\dot\Phi = M_\delta + M_\alpha \qquad (17)$$

where:

$I$=missile inertia in pitch plane
$\beta$=aerodynamic damping coefficient
$M_\delta = \frac{1}{2}\rho V^2 S_r l_r C_{m\delta}\delta$
$M_\alpha = \frac{1}{2}\rho V^2 S_r l_r C_{m\alpha}\alpha$
$\rho$, $V$, $S_r$, $\alpha$, $\delta$, $C_{m\delta}$ and $C_{m\alpha}$=as defined in Equations 7 and 9

$l_r$=moment arm from center of pressure to C.G. of missile, ft.

This analysis is concerned with the basic guidance philosophy and not with the detailed dynamic behavior of the missile; thus only the steady-state conditions are of interest.

Therefore, substituting for the lift $L$ in Equation 15, results in the following:

$$V\dot\theta = \tfrac{1}{2}\rho V^2 S_r C_L \qquad (18)$$

Using the definition of $C_L$ of Equation 16, and substituting Equation 16 with Equation 18 gives the following:

$$V\dot\theta = \tfrac{1}{2}\rho V^2 S_r (C_{L\alpha}\alpha + C_{L\delta}\delta) \qquad (19)$$

At steady-state $\ddot\Phi = \dot\Phi = 0$ thus at steady-state, Equation 17 is reduced to:

$$M_\alpha = M_\delta \qquad (20)$$

Substituting the Equation 17 definitions of $M_\alpha$ and $M_\delta$ into Equation 20 gives the following:

$$\alpha = -\frac{C_{m\delta}}{C_{m\alpha}}\delta \qquad (21)$$

Substituting Equation 21 into 19, Equation 19 can be rewritten as follows:

$$V\dot\theta = 1/2\rho V^2 S_r \left(C_{L\delta} - \frac{C_{m\delta}}{C_{m\alpha}}C_{L\alpha}\right)\delta \qquad (22)$$

Equation 22 may be reduced as follows:

$$V\dot\theta = K_3 \rho V^2 \delta \qquad (23)$$

where:

$$K_3 = 1/2 S_r \left(C_{L\delta} - \frac{C_{m\delta}}{C_{m\alpha}} C_{L\alpha}\right)$$

dependent on the particular aerodynamic configuration of the missile.

It was previously shown by Equation 6 that:

$$T_F = K\rho V^2 \delta$$

Therefore, by a comparison of Equation 6 and Equation 23, it can be seen that:

$$V\dot\theta = \frac{K_3}{K} T_F \qquad (24)$$

From a comparison of Equation 24, Equation 12 and Equation 10, it can be seen that:

$$E_s \propto K\rho V^2 \delta$$

Thus it can be seen that the error signal $E_s$ is proportional to the "aerodynamic spring rate," thus establishing by definition the torque balance concept. It can be seen that the same relationships can be made to apply to the yaw plane of motion so that for a roll stabilized missile the rate of rotation of the line-of-sight reflects the true solid angle corrective action required and results in lateral accelerations of the missile.

The full import of the torque balance, or more rightly, torque-proportional approach can be made more apparent by a brief comparison with the more conventional position-proportional control. In the position-proportional method the fin deflection $\delta$ is assumed to be proportional to the rate of rotation of the line-of-sight. Expressed mathematically as follows:

$$\delta \propto \lambda \qquad (25)$$

Equation 23, at constant velocity and density, can be written as follows:

$$\dot\theta \propto \delta \qquad (26)$$

Thus Equations 25 and 26 satisfy the conditions for proportional control. However, at varying velocity, it has been shown that $\lambda$ is directly proportional to velocity:

$$\dot\lambda = E_p V \qquad (27)$$

Substituting Equation 27 into Equation 18, the result is as follows:

$$E_p V = K_4 \delta \qquad (28)$$

Substituting Equation 23 into Equation 28 and rearranging terms, the general relationship is:

$$\dot{\theta} = \frac{K_3}{K_4} \rho V^2 E_p \qquad (29)$$

Equation 29 clearly indicates that the rate of change in heading is dependent on the dynamic pressure. This means a missile designed for adequate control at low velocities may be over-controlled at high velocities. Since effects of lateral acceleration must also be taken into consideration, a severe design problem may result due to the tendency to over-control, thus necessitating a more sophisticated control requiring far more power than one employing the principles of torque balance.

The problem solved by this invention is the construction of a control mechanism wherein an electrical input signal $E_s$ is converted into an amplified force proportional to the input signal $E_s$, and this amplified force is applied to the vehicle steering element through an actuation arm to provide a torque proportional to the input signal $E_s$.

For the purposes of clarity in the description of the instant invention, a movable pivot is herein defined as a pivot that does not have a fixed spatial location. A fixed pivot is herein defined as a pivot having a fixed spatial location.

Referring now to the drawings wherein like characters are used throughout to designate like elements, and more specifically to FIGURE 5, wherein is shown generally at 1 a torque motor, such torque motor devices being well known in the art. Torque motor 1 generally comprises electrical coils and pole pieces indicated generally at 2 and 3 and secured to a housing 4. An armature 5 positioned intermediate said coil-pole pieces 2 and 3 with said armature fixedly pivotably secured to housing 4 such that an electrical signal $E_s$ communicated to electrical coils 2 and 3 via electrical conduits 6 and 7 will cause armature 5 to rotate about its pivot such that said armature is bidirectionally physically displaced in proportion to the magnitude of the electrical input signal $E_s$.

It is to be understood that torque motor 1 is merely representative of a preferred embodiment of a family of devices capable of producing as an output a physical displacement of low energy level that is proportional to the magnitude of a low energy level electrical input signal.

Referring again to FIGURE 5, armature 5 is connected to one end of link 8 by movable pivot 9. The other end of link 8 is connected to one end of link 10 by means of movable pivot 11 such that there exists a one-to-one correspondence between the physical displacement of pivot 9 and pivot 11. The end of link 10 opposite pivot 11 is connected to link 12 by means of movable pivot 13. A pilot valve 14 is slideably mounted in bore 15 of housing 16, said pilot valve 14 being maintained in substantially fluid tight engagement with bore 15 by virtue of a close tolerance fit between the circumference of the lands of pilot valve 14 and the diameter of bore 15. Pilot valve stem 17 integrally connected to pilot valve 14 is connected to link 10 by movable pivot 51 positioned intermediate end pivots 11 and 13 of said link 10. A chamber 18 intermediate the lands of pilot valve 14 is supplied with pressurized fluid from a suitable source of pressurized fluid 19 via conduit 20.

Suitably mounted in the bore of housing 21 of a power amplifying actuator, shown generally at 22, is load piston 24, with an integrally connected output shaft 23, said output shaft 23 and load piston 24 are maintained in slideably fluid tight relation with housing 21 by means of O-rings 25 and 26 respectively. A chamber 27, defined by one end surface of load piston 24 and one end surface of housing 21, receives pressurized fluid from pilot valve chamber 18 via conduit 28. A second chamber 29, defined by the end of load piston 24 integrally connected to output shaft 23 and the bore and other end surface of housing 21, receives pressurized fluid via conduit 30 from said source of pressurized fluid 19. Link 31 is connected at one end to output shaft 23 by movable pivot 32, and the opposite end of link 31 is connected to link 33 by movable pivot 34. Link 31 is fixedly oriented spatially by fixed pivot 35 connected to link 31 intermediate movable pivots 32 and 34. Link 33 is connected at one end to link 36 by movable pivot 37. The opposite end of link 33 is secured to spring 38. Movable pivot 34 connecting links 33 and 31 is positioned intermediate the ends of link 33. The opposite ends of link 39 are connected to links 36 and 40 by movable pivots 47 and 48 respectively. Link 12 is connected to link 36 intermediate end pivots 37 and 47 by movable pivot 46. One end of link 41 is connected to the torque arm 43 of aerodynamic fin 42 by movable pivot 44. The opposite end of link 41 is in engagement with spring 38 such that spring 38 is positioned intermediate the non-pivotably connected ends of links 33 and 41 with the opposite ends of spring 38 being secured to said non-pivotably connected ends of links 33 and 41 respectively. Link 40 is connected to fixed pivot 45 intermediate movable pivots 48 and 49. Torque arm 43 is fixedly connected to aerodynamic fin 42 such that the force transmitted to torque arm 43 via link 41 causes torque arm 43 and aerodynamic fin 42 to rotate in unison about fixed hinge pin 50.

*Operation*

The above-described control mechanism is positioned responsive to a control input signal $E_s$ received from an appropriate guidance system device well known in the art. The guidance system device computes the command signal $E_s$ transmitted to the control unit. Illustrative of a family of guidance devices well known in the art, a signal computing device comprising a tracker unit having an infrared sensor is positioned in a gimbal mounted platform having one or more rate gyros capable of generating an electrical signal $E_s$ that continuously computes the angular rate of change or velocity of the guidance tracker unit with respect to some fixed reference axis. This angular velocity is presented in the form of an electrical analog signal $E_s$ that varies in magnitude proportional to the magnitude of the angular velocity. This guidance signal $E_s$ is communicated to torque motor 1 via electrical conduits 6 and 7 such that a variation in the magnitude of the electrical signal $E_s$ will cause fixedly pivotably mounted armature 5 to be displaced proportional to the magnitude of the signal $E_s$. Armature 5 is secured to link 8 by means of movable pivot 9 such that a displacement of armature 5 will cause a uniform longitudinal axial displacement of both pivot 9 and pivot 11. By way of illustration, a representative displacement of pivot 11 is denoted as X in FIGURE 5. At the instant of time when pivot 11 is displaced distance X responsive to a change in input command signal $E_s$, pivot 13 assumes the characteristics of a fixed pivot and link 10 rotates counterclockwise about pivot 13 in response to displacement X. Pilot valve 14, secured to link 10 by means of pilot valve stem 17 and pivot 51, will be displaced upward in bore 15 as a result of the counterclockwise movement of link 10. The upward displacement of pilot valve 14 will restrict the flow of pressurized fluid from chamber 18 into conduit 28 and will connect chamber 27 through conduit 28 via the lower land of pilot valve 14 to atmospheric pressure to thus reduce the pressure in chamber 27.

Load piston 24 and its integral piston rod 23 are so constructed that the area of the end piston 24 adjacent the surface attached to piston rod 23 is one-half the area of the opposite end surface of piston 24. Thus, it can be seen that a force balance will exist on piston 24 when the pressure in chamber 27 is one-half the pressure in chamber 29. In the embodiment shown in FIGURE 5, the pressure in chamber 29 is always maintained at a single fixed pressure $P_s$. The pressure in chamber 27 by means of the position of the lower land of pilot valve 14 is varied above and below an equilibrium pressure equal to one-half $P_s$ thus producing a control limited bidirectional axial movement of load piston 24 about its center position within housing 21 at a substantially increased force level.

The reduction of pressure in chamber 27, responsive to the throttling action of the lower land of pilot valve 14 between conduit 28 and atmospheric pressure resulting from the counter-clockwise movement of link 10, will cause piston 24 and its fixedly attached piston rod 23 to move axially upward in housing 21 such that link 31 connected to piston rod 23 by movable pivot 32 will be caused to rotate clockwise about pivot 35. The clockwise movement of link 31 will cause link 33, connected to link 31 by movable pivot 34, to be axially displaced. The axial displacement of link 33 will cause spring 38 to be deflected. In the illustrative example, the deflection of spring 38 responsive to the displacement X is designated as δ. A reactive force F, which is transmitted to torque arm 43 via link 41, is necessary to permit the deflection δ of spring 38.

Simultaneous with the deflection δ of spring 38, link 36 connected to link 33 by movable pivot 37 is rotated counterclockwise about pivot 47. At the instant of time when pivot 37 is displaced axially by the movement of link 31, pivot 47 assumes the characteristics of a fixed pivot responsive to the reaction of interconnected links 39, 40 and 41 respectively. At the instant of the displacement of link 12, pivot 11 assumes the characteristics of a fixed pivot. The counterclockwise movement of link 36 causes link 10 to rotate clockwise about pivot 11 responsive to the displacement of link 12 connected to link 36 and link 10 by means of movable pivots 46 and 13 respectively. This clockwise movement of link 10 about pivot 11 causes pilot valve 14 to be displaced downward in a manner such that the lower land of pilot valve 14 blocks conduit 28 from atmospheric pressure and admits pressure from chamber 18 into conduit 28 to increase the pressure in chamber 27. Piston 24 will continue to move axially in housing 21 responsive to the initial decrease in pressure in chamber 27 until the counteracting force transmitted via links 31, 33, 36, 12, 10 and 17 causes pilot valve 14 to be displaced sufficiently to increase the pressure in chamber 27 to the point where the force on the opposite sides of piston 24 resulting from the pressure in chambers 27 and 29 is equal.

It will be noted that in response to the illustrative displacement X, the deflection δ of spring 38 causes a reaction force F to be transmitted to torque arm 43 via link 41.

The torque motor, shown generally at 1, is so constructed and arranged that the magnitude of the input signal $E_s$ is proportional to the physical displacement X of the armature 5. Thus:

$$E_s \propto X \quad (1)$$

It can be seen from the above description of the operation of the instant invention that the displacement X is proportional to the deflection δ, and hence the force F, such that:

$$X \propto F \quad (2)$$

It will be noted that when force F is applied to torque arm 43, a torque $F_r$ is produced about hinge pin 50. This torque $F_r$ balances the torque $R \times L_{cpf}$ produced by the resultant aerodynamic force R acting through the center of pressure of aerodynamic fin 42 about hinge pin 50.

It can be seen by comparison of Equations 1 and 2 above that $E_s$ is proportional to F, and since the moment arm r remains constant it can be seen that $E_s$ is proportional to $F_r$.

Thus it will be noted that the invention in its preferred form provides a control mechanism whereby an electrical input signal $E_s$ is proportional to the torque $F_r$ applied to the aerodynamic control surface, while simultaneously increasing the force level of the input signal $E_s$ by means of the force amplifying actuator system shown generally at 22.

Although the control mechanism has been described with relation to a missile guidance system, it is not limited to that use. It may be used anywhere for the conversion of a low level electrical input signal to an amplified force output signal proportional to the input signal. Although one embodiment of this invention has been illustrated and described herein, it will be apparent that various changes may be made in the construction and arrangement of the various elements and parts without departing from the scope of this novel concept. It is to be understood that this invention is not limited to the specific embodiment herein illustrated, but may be used in other ways without departing from its spirit as defined in the following claims:

What I claim is:

1. A control mechanism comprising; input means responsive to an electrical input signal, force amplifying means, first linkage means connecting said input means to the input of said force amplifying means, second linkage means having resilient means connected in series force relationship with elements of said second linkage means, said second linkage means being connected to the output of said force amplifying means and said first linkage means thereby simultaneously providing a feedback loop around said amplifying means and a force output of said second linkage, each discrete magnitude of which is proportional to a corresponding discrete electrical input signal regardless of the extent of movement of said second linkage means.

2. Apparatus for transforming an electrical input signal into a proportional force output signal at an increased energy level comprising, electrical input signal receiving means, force amplifying means embodying pilot valve means, first linkage means connected to said input means and said pilot valve means, said pilot valve means in cooperation with said amplifying means being arranged to increase the force of an electrical input signal upon actuation of said pilot valve by said first linkage means responsive to said input signal, a second linkage means connected to said amplifying means and said first linkage means and having a follow-up movement such that movement of the output member of said amplifying means causes said pilot valve to respond to movement of the output member of said amplifying means, resilient means operatively connected to elements of said second linkage means and adapted to receive the output of said amplifying means such that force output of said second linkage means is proportional to the magnitude of the electrical input signal regardless of the extent of movement of said second linkage means.

3. A control signal transformation and amplification device, electrical signal receiving means, first linkage means, force amplifying servo means, said first linkage means being connected to said receiving means and said servo means to effect a force amplified output movement of said servo means responsive to movement of said receiving means, second linkage means connected to said first linkage means and said servo means to provide a feedback loop around said servo means, resilient means operatively connected to said second linkage means and receiving the amplified force signal from said servo means such that the force output of said second linkage means is proportional to the electrical signal input of said receiving means regardless of the extent of movement of said second linkage means.

4. A control mechanism comprising; electrical signal receiving means, first linkage means joined to said receiving means, second linkage means, servo means intermediate said first and said second linkage means to increase the magnitude of the force of each movement of said first linkage means, said second linkage means being connected to said first linkage means to provide a feedback loop around said servo means, resilient means in series force communication with at least one element of said second linkage means thereby providing a force output from said second linkage means each increment of which is proportional to each corresponding increment of said electrical input signal regardless of the extent of movement of said second linkage means.

5. A control system as claimed in claim 1 wherein the electrical input signal receiving means comprises a torque motor adapted to receive a varying input signal and establish an output signal such that each physical displacement of said torque motor output member is proportional to a corresponding variation of said electrical input signal.

6. A control mechanism as claimed in claim 1 wherein said first linkage means comprises a first member having one end connected to said input receiving means to form a first movable pivot and the other end connected to a second member to form a second movable pivot, a third member having one end connected to said first member intermediate said first and said second movable pivots to form a third movable pivot and the other end of said third member being connected to said force amplifying means, the second end of said second member being connected to said second linkage means to form a fourth movable pivot such that said second pivot functions as a fixed pivot to permit motion imparted to said first member by said input means to be transmitted to said force amplifying means via said third member while said first pivot functions as a fixed pivot to permit feedback motion imparted to said second member via said second linkage to be imparted to said amplifying means via said third member.

7. A control mechanism as claimed in claim 6 wherein said amplifying means comprises a piston and integrally connected piston rod slidably contained within a housing such that the larger surface area of said piston and said housing describe a first chamber and the smaller surface area of said piston and said housing describe a second chamber, a pilot valve having an inlet and an outlet, said pilot valve outlet being in fluid communication with said first chamber, a source of pressurized fluid in simultaneous fluid communication with said second chamber and said inlet of said pilot valve, said pilot valve being so constructed and arranged that bidirectional motion of said pilot valve produces a variation in the magnitude of the pressurized fluid at the outlet of said pilot valve thereby causing a bidirectional movement of said piston rod at an increased force level responsive to bidirectional movement of said third member of said first linkage, a force beam movably pivotably connected at its opposite ends to said piston rod and said second linkage means respectively and fixedly pivotably connected intermediate said ends such that output motion of said force beam is fed back to said pilot valve via said second and said first linkage means and simultaneously applied to the work load via said second linkage means.

8. A control mechanism as claimed in claim 1 wherein said second linkage means comprises first, second and third members, one end of each said first and second members being movably pivotably connected to an opposite end of said third member, the other end of said first member being movably pivotably connected to one end of a fourth member and the other end of said second member movably pivotably connected to a fifth member, said first member being movably pivotably connected to said first linkage means intermediate the ends of said first member, said second member being fixedly pivotably connected intermediate the ends of said second member, resilient means positioned intermediate said fourth and said fifth members and in series force relationship with said fourth and fifth members, said force amplifying means being movably pivotably connected to said fourth member intermediate the ends of said fourth member such that bidirectional output motion of said force amplifying means causes bidirectional deflections of said resilient means and a corresponding increase or decrease in the longitudinal force at the output end of said fifth member.

9. A control mechanism as set forth in claim 8 wherein said resilient means comprises a spring having a linear deflection rate.

10. Control mechanism for providing a force on a work-piece proportional to an electrical input signal comprising, means transforming an electrical input signal into a proportional mechanical movement, force amplifying means having an input member and an output member, linkage means forming a feedback connecting said output member with said input member and with the output of said transforming means to provide a movement of the output member proportional to movement of the output of said transforming means, a movable workpiece, means including spring means having a spring rate, connecting said output member with said workpiece, and mechanism, forming part of the feedback connection, compensating for movement of said workpiece so as to provide a force on said workpiece proportional to said electrical input signal regardless of the extent of movement of said workpiece.

11. A device as claimed in claim 10 wherein said compensating mechanism includes means connecting said workpiece with the input of said amplifying means to move said output member proportional to the movement of said workpiece so as to maintain the force output of said amplifying means proportional to the movement of transforming means.

12. Force control mechanism comprising means transforming an electrical signal into a proportional mechanical movement including a pilot valve and a servo motor, having a position determining feedback from motor to said pilot valve, a workpiece, means including spring means connecting said workpiece with said feedback and modifying said feedback relation between said pilot valve and motor with each movement of said workpiece so that movement of the workpiece side of the spring means will produce an equal movement of the servo motor and the feedback side of said spring means, and provide spring compression and a force on said workpiece proportional to said electrical signal in all positions of said workpiece.

References Cited

UNITED STATES PATENTS

| | | | |
|---|---|---|---|
| 1,530,445 | 3/1925 | Warren | 89—41.7 |
| 2,679,138 | 5/1954 | Kane | 60—53 |
| 2,729,940 | 1/1956 | Walker | 60—53 |
| 2,938,435 | 5/1960 | Gille | 89—41.7 |

BENJAMIN A. BORCHELT, *Primary Examiner.*

VERLIN R. PENDEGRASS, *Assistant Examiner.*

UNITED STATES PATENT OFFICE
CERTIFICATE OF CORRECTION

Patent No. 3,414,216

December 3, 1968

Jack O. Nash

It is certified that error appears in the above identified patent and that said Letters Patent are hereby corrected as shown below:

Column 1, line 67, after "varying" insert -- electrical --. Column 4, line 7, cancel "where:" and insert the same before "K" in line 8, same column 4. Column 12, line 72, after "means" insert -- and connected to both said firs and said second linkage means --; line 74, "first" should read -- second --; same line 74, after "means" insert -- responsive to corresponding movement of said first linkage means, --. Column 14, line 44, before "motor" insert -- said --.

Signed and sealed this 10th day of March 1970.

(SEAL)
Attest:

Edward M. Fletcher, Jr.
Attesting Officer

WILLIAM E. SCHUYLER, JR.
Commissioner of Patents